(12) United States Patent
Colquhoun et al.

(10) Patent No.: US 11,928,166 B2
(45) Date of Patent: *Mar. 12, 2024

(54) DATA RETRIEVAL SYSTEM AND METHOD

(71) Applicant: Palantir Technologies Inc., Palo Alto, CA (US)

(72) Inventors: Elliot Colquhoun, Auckland (NZ); Hugh Zabriskie, Houston, TX (US); Joshua Casale, New York, NY (US); Rahij Ramsharan, London (GB); Rushad Heerjee, London (GB)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/901,196

(22) Filed: Sep. 1, 2022

(65) Prior Publication Data

US 2023/0004606 A1 Jan. 5, 2023

Related U.S. Application Data

(63) Continuation of application No. 17/066,922, filed on Oct. 9, 2020, now Pat. No. 11,468,130.

(30) Foreign Application Priority Data

Oct. 10, 2019 (GB) ..................... 1914692

(51) Int. Cl.
*G06F 7/02* (2006.01)
*G06F 16/00* (2019.01)
(Continued)

(52) U.S. Cl.
CPC ........ *G06F 16/9532* (2019.01); *G06F 16/951* (2019.01); *G06F 16/9538* (2019.01); *G06F 16/954* (2019.01); *G06F 16/134* (2019.01)

(58) Field of Classification Search
CPC ............... G06F 16/9532; G06F 16/951; G06F 16/9538; G06F 16/954; G06F 16/134
See application file for complete search history.

(56) References Cited

U.S. PATENT DOCUMENTS 7,693,834 B2* 4/2010 Gross ................... G06F 16/951
707/759
10,528,599 B1 1/2020 Pandis et al.
(Continued)

FOREIGN PATENT DOCUMENTS

EP 3805943 A1 4/2021

OTHER PUBLICATIONS

Faujong, "sql-Query a database based on result of query from another database," question asked May 2, 2017 and answered May 2-22, 2017, taken from https://stackoverflow.com/questions/43746258/query-a-database-based-on-result-of-query-from-another-database. (Year: 2017).*

(Continued)

*Primary Examiner* — Bruce M Moser
(74) *Attorney, Agent, or Firm* — Faegre Drinker Biddle & Reath LLP—Palantir

(57) ABSTRACT

A method, performed by one or more processors, including: receiving a user query; deriving, based on the user query, a search engine query for use with search engine software and a data access query for use with data access software; sending, to the search engine software, the search engine query to cause the search engine software to locate first data stored in a search engine index; sending, to the data access software, the data access query to cause the data access software to locate second data stored in a distributed data store; receiving, from the search engine software, the first data; and receiving, from the data access software, the second data.

20 Claims, 8 Drawing Sheets

(51) Int. Cl.
     *G06F 16/951*    (2019.01)
     *G06F 16/9532*   (2019.01)
     *G06F 16/9538*   (2019.01)
     *G06F 16/954*    (2019.01)
     *G06F 16/13*     (2019.01)

(56) References Cited

U.S. PATENT DOCUMENTS

| | | |
|---|---|---|
| 10,977,260 B2 | 4/2021 | Pal et al. |
| 11,468,130 B2 | 10/2022 | Colquhoun et al. |
| 2004/0122807 A1 | 6/2004 | Hamilton et al. |
| 2005/0234889 A1 | 10/2005 | Fox et al. |
| 2017/0236073 A1 | 8/2017 | Borisyuk et al. |
| 2020/0050695 A1 | 2/2020 | Benjamin et al. |
| 2021/0019806 A1 | 1/2021 | Galopo et al. |

OTHER PUBLICATIONS

Dhulavvagol, Praveen M. et al.; Performance Analysis of Distributed Processing System using Shard Selection techniques on Elasticsearch; Procedia Computer Science; vol. 167; pp. 1626-1635; Jan. 1, 2020.
Schwarte, Andreas et al.; FedX: A Federation Layer for Distributed Query Processing on Linked Open Data; Big Data Analytics on the Social and Ubiquitous Context: 5th International Conference on Modeling Social Medica; MSM 2014; Jun. 2011.

\* cited by examiner

Search User Interface 600C

610C — `SELECT ID, A, B, C FROM DataSets WHERE D = 'DesiredValD'`

620C

| ID | Property A | Property B | Property C |
|---|---|---|---|
| Id1 | ValA1 | ValB1 | ValC1 |
| Id2 | ValA2 | ValB2 | ValC2 |
| Id3 | ValA3 | ValB3 | ValC3 |
| Id4 | ValA4 | ValB4 | ValC4 |
| Id5 | ValA5 | ValB5 | ValC5 |
| Id6 | ValA6 | ValB6 | ValC6 |
| Id7 | ValA7 | ValB7 | ValC7 |
| Id8 | ValA8 | ValB8 | ValC8 |
| Id9 | ValA9 | ValB9 | ValC9 |
| Id10 | ValA10 | ValB10 | ValC10 |
| Id11 | ValA11 | ValB11 | ValC11 |
| Id12 | ValA12 | ValB12 | ValC12 |
| Id13 | ValA13 | ValB13 | ValC13 |
| Id14 | ValA14 | ValB14 | ValC14 |
| Id15 | ValA15 | ValB15 | ValC15 |
| Id16 | ValA16 | ValB16 | ValC16 |
| Id17 | ValA17 | ValB17 | ValC17 |
| Id18 | ValA18 | ValB18 | ValC18 |

630C

| Associated Data Objects ||||| 
|---|---|---|---|---|
| Object ID | Object Type | Object Name | Associated Records | |
| ObjId1 | EntityTypeX | Name1 | Id1, Id3 | ↗ |
| ObjId2 | EventTypeX | Name2 | Id4 | ↗ |
| ObjId3 | EntityTypeY | Name3 | Id5, Id16 | ↗ |
| ObjId4 | EntityTypeX | Name4 | Id8, Id9 | ↗ |
| ObjId5 | EventTypeY | Name5 | Id10 | ↗ |
| ObjId6 | EventTypeZ | Name6 | Id3 | ↗ |
| ObjId7 | EntityTypeX | Name7 | Id2 | ↗ |
| ObjId8 | EntityTypeZ | Name8 | Id7 | ↗ |

Figure 5C

DATA RETRIEVAL SYSTEM AND METHOD

CROSS REFERENCE TO RELATED APPLICATIONS

This application is a continuation of U.S. application Ser. No. 17/066,922, filed Oct. 9, 2020, which claims priority to UK Patent Application No. 1914692.7, filed on Oct. 10, 2019, both incorporated by reference herein for all purposes.

TECHNICAL FIELD

The present disclosure relates to systems and methods for retrieving data.

BACKGROUND

Data retrieval is a key function of modern computer systems. Data may be retrieved from a variety of data storage systems using appropriate retrieval operations. An example of a data storage system is a database. Data may be retrieved from a database using a query.

A database is an organized collection of data which is stored and may be accessed electronically. Databases are used in virtually every commercial sector to store, organize and manage data relating to, for example, to cybersecurity data, technical processes, data analysis and transformation processes, and inventory management, to give a very limited number of examples. Non-relational databases tend to be the preferred class where scalability and distribution of database storage nodes on multiple computer systems is needed. Such scalability and provision of distributed storage are factors that many modern database users require, particularly where databases hold large amounts of data which increase over time. However, as the amount of data in a database grows, the amount of time required to retrieve data relevant to a query may also increase. This may hinder the usefulness of the database for online use.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

According to a first aspect of the specification, there is provided a method, performed by one or more processors, including: receiving a user query; deriving, based on the user query, a search engine query for use with search engine software and a data access query for use with data access software; sending, to the search engine software, the search engine query to cause the search engine software to locate first data stored in a search engine index; sending, to the data access software, the data access query to cause the data access software to locate second data stored in a distributed data store; receiving, from the search engine software, the first data; and receiving, from the data access software, the second data.

The search engine software may be distributed search engine software.

The search engine index may be a distributed inverted index.

The data access software may include a cluster-computing framework.

The distributed data store may be a distributed database.

The search engine index may store a subset of data stored in the distributed data store.

The distributed data store comprises a first one or more computing devices located at a first data center and a second one or more computing devices located at a second data center.

The method may further include, in response to receiving the first data, sending the first data to a client device, and in response to receiving the second data, sending the second data to the client device. The operations of receiving and sending of the second data may be subsequent to the operations of receiving and sending of the first data.

According to a second aspect of the specification, there is provided a system including:

retrieval software; a search engine index; a distributed data store storing a superset of data stored in the search engine index; search engine software; and data access software.

The search engine software may be configured to receive a search engine query in response to receiving the search engine query, to locate first data stored in the search engine index; and to send the first data to the retrieval software. The data access software may be configured to receive a data access query, in response to receiving the data access query, to locate second data stored in the distributed data store, and to send the second data to the retrieval software.

The retrieval software may be configured to send, to the search engine software, a search engine query, receive, from the search engine software, first data, wherein the first data comprises one or more data records, derive, based on the one or more data records, a data access query for locating one or more data objects derived using data extracted from the one or more data records, send, to the data access software, the data access query, and receive, from the data access software, second data comprising the one or more data objects.

The one or more data objects may be rich data objects defined using an ontology. The one or more data records may be log records.

The retrieval software may be configured to receive a user query, to derive, based on the user query, a search engine query for use with the search engine software and a data access query for use the with data access software, to send, to the search engine software, the search engine query, to send, to the data access software, the data access query, to receive, from the search engine software, the first data, and to receive, from the data access software, the second data.

The retrieval software may be configured, in response to receiving the first data, to send the first data to a client device, and in response to receiving the second data, to send the second data to the client device.

The system may further include a client device configured to send, to the retrieval software, the user query, to receive, from the retrieval software, the first data, in response to receiving the first data, to display the first data, to receive, from the retrieval software, the second data, and in response to receiving the second data, to display the second data.

The receiving and displaying of the second data may be subsequent to the receiving and displaying of the first data.

The distributed data store may include a first one or more computing devices located at a first data center and a second one or more computing devices located at a second data center.

The one or more server computing devices may be configured to perform any method according to the first aspect According to a third aspect, there may be provided a computer program, optionally stored on a non-transitory computer readable medium, which when executed by one or more processors of a data processing apparatus, may cause the data processing apparatus to carry out any method according to the first aspect.

BRIEF DESCRIPTION OF THE DRAWINGS

The features of the subject innovations are set forth in the appended claims. However, for purpose of explanation, several aspects of the disclosed subject matter are set forth in the following figures.

FIGS. 5A, 5B and 5C are representative drawings illustrating an example instance of a graphical user interface for displaying data received from retrieval software.

DETAILED DESCRIPTION

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

Computer System

Figure 1:
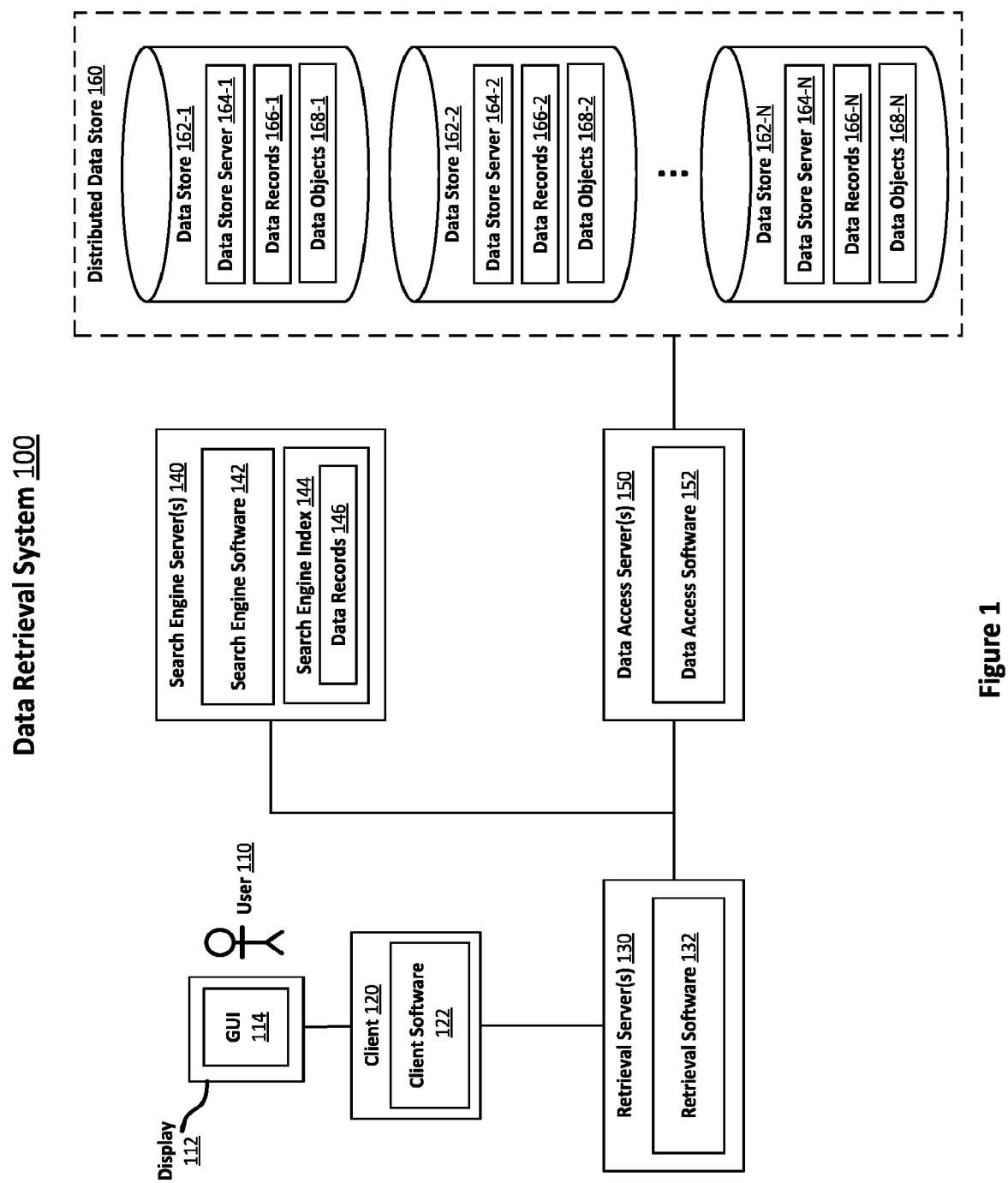
FIG. 1 is a block diagram illustration an example of a computer system configured to facilitate data retrieval, in accordance with example embodiments.

FIG. 1 illustrates an example of a computer system configured to facilitate data retrieval, henceforth referred to as the data retrieval system 100.

As shown, the data retrieval system 100 may comprise a client computing device 120 usable by a human user 110, one or more retrieval servers 130, one or more search engine servers 140, one or more data access servers 150, and one or more distributed data stores 160. The client computing device 120 and at least one of the one or more retrieval servers 130 may be configured to communicate with one another via a network (not shown). The network may include the Internet, an intranet, a local area network (LAN), a wide area network (WAN), a wired network, a wireless network, a virtual private network (VPN), and/or any combination of such networks, whether wireless or wired. For ease of understanding, various components of the system have each been described with reference to one or more computing devices. It should be noted that, in some embodiments, any number of these components may be collocated on the same computing device or distributed across multiple computing devices.

The client computing device 120 may for instance be a laptop computer, a desktop computer, a mobile phone, a personal digital assistant (PDA), a tablet computer, a netbook, a television with one or more processors embedded therein or coupled thereto, a physical machine or a virtual machine. The client computing device 120 may include one or more of a keyboard, a mouse, a display 112, or a touch screen (of which the display 112 may be a part of) or another form of input device. For example, the client computing device 120 may be composed of hardware components like those of computing device 500 described below with respect to FIG. 6.

The client computing device 120 may include client software 122 for displaying and analyzing received data. The client software 122 may interact with retrieval software 132 on the one or more retrieval servers 132 to provide this functionality. Aspects of the functionality of the client software 122 may be provided using one or more embodiments of the method 400 described with respect to FIG. 4.

The functionality of the client software 122 may be accessed and interacted with by the user 110 using a graphical user interface (GUI) 114 shown on the display. The graphical user interface 114 may be provided by the client software 122. The graphical user interface 114 may be a web browser window, a client application window, an operating system window, an integrated development environment window, a virtual terminal window or other computer graphical user interface window. An example graphical user interface 600 is illustrated in, and described with respect to FIGS. 5A-5C.

While only one user 110 and one client computing device 120 are illustrated in FIG. 1, example embodiments may be implemented for use by one or more users associated with one or more client computing devices.

Each of the one or more retrieval server(s) 130 may include one or more processors (e.g. CPUs), a network interface, and memory. The processor is configured to execute computer instructions that are stored in one or more computer-readable media, for example, the memory of the respective server.

Each of the one or more retrieval servers 130 may include a network interface that is configured to allow the server to transmit and receive data in one or more networks, e.g. one or more networks connecting the retrieval server 130 to at least one of the one or more search engine servers 140 and/or at least one of the one or more data access servers 150. The network interface may include one or more network interface cards (NICs). The memory of the one or more retrieval servers 130 stores its respective data, software and computer-readable instructions which, when executed by the one or more processors of said retrieval servers, may perform operations described herein.

The one or more retrieval server(s) 130 may include retrieval software 132. The retrieval software 132 may provide functionality for receiving user queries from the client computing device 120, retrieving data using the one or more search engine servers 140 and the one or more data access servers 150, and sending data to the client computing device 120. Aspects of the functionality of the retrieval software 132 may be provided by the retrieval software operating according to one or more embodiments, for example operations of a first method 200 and/or operations of a second method 300, each of which is described below.

Each of the one or more search engine servers 140 may include one or more processors (e.g. CPUs), a network interface, and memory. The processor(s) may be configured to execute computer instructions that are stored in one or more computer-readable media, for example, the memory of the respective search engine server. Each of the one or more search engine servers 140 may include a network interface that is configured to allow the search engine server to transmit and receive data using one or more networks, e.g.

the one or more networks connecting the retrieval server 130 to at least one of the one or more search engine servers 140. Where there are a plurality of search engine servers, the one or more networks may include one or more networks connecting the search engine server(s) with one another. The network interface may include one or more network interface cards (NICs). The memory of each of the one or more search engine servers 140 may store its respective data and instructions. In some embodiments, the one or more search engine servers 140 may be a plurality of search engine servers, e.g. a search engine server cluster, implementing a distributed search engine.

Each of the one or more search engine servers 140 may include search engine software 142. The search engine software 142 may be configured to receive a search engine query, which may be received from the retrieval server 130 and/or the retrieval software 132. The search engine software 142 may locate data in a search engine index 144 in response to receiving the search engine query, and send the located data to the retrieval server 130 and/or the retrieval software 132. The search engine query may be received in a text format specified by the search engine software 142 and/or via application programming interface (API) calls to the search engine software 142. For example, the search engine query may be in the Query DSL (Domain Specific Language). The located data may include one or more data records 146. The search engine software 142 may be any suitable search engine software. The search engine software 142 may be adapted for online use, e.g. to locate and retrieve some data relevant to the query nearly instantaneously. The adaptation of the search engine software 142 to online use may limit the amount of data that can be efficiently retrieved for each query. For example, a single Elasticsearch query cannot be used to retrieve more than 10000 data records at a time. The number of data records that may be efficiently or near instantaneously retrieved may have a lower limit, e.g. between 100 and 1000 records.

Where a single search engine server 140 is used, the search engine software 142 may be an information retrieval library suitable for use on a single server, e.g. Lucene, Xapian or Sphinx.

Where a plurality of search engine servers 140 are used, the search engine software 142 may be distributed search engine software configured for use across multiple servers, e.g. ElasticSearch or Solr. While configured for use across multiple servers, the distributed search engine software 142 may be adapted for situations where there is a low latency connection between the servers. The distributed search engine software may not be well suited for use across multiple servers located across several data centers. The distributed search engine software 142 may be particularly unsuited for use across data centers which are geographically distant from one another. The plurality of search engine servers 140 may be located in one data center or geographically proximate data centers, e.g. data centers within a hundred miles of one another. Distributed search engine software adaptation to low latency connections between search engine servers 140 may make it undesirable to use too large a number of search engine servers. Correspondingly, there may be an upper limit on the amount of data that it is desirable to store across the search engine servers 140.

The search engine index 144 may be any index usable by the search engine software 142 for locating and retrieving data. The search engine index 144 may have been created using the search engine software 142. The search engine index 144 may include a subset of the data stored in the distributed data store 160. Where there is a limit on the amount of data which it is possible and/or desirable to store in the search engine index 144, the subset of the data may be the data which is considered to have the 'highest value'. The highest value data may be data of types where there is a limited amount of that type of that data available and/or data which users of the data retrieval system 100 are most likely to desire fast access to.

The search engine index 144 may have been created by using application programming interface (API) calls to the search engine software 144, or a component thereof, to add data contained in the distributed data store to the search engine index 144. The search engine index 144 may be an inverted index. An inverted index may store a mapping from content to a table location and/or document. Where a plurality of search engine servers 140 are used, the search engine index 144 may be distributed across the search engine servers 140. The search engine index 144 may be distributed across the servers as index shards. Where the index shards are inverted indices, the search engine index 144 may be a distributed inverted index.

The search engine index 144 may include a plurality of data records 146. Each data record of the plurality of data records 146 may include values for one or more properties. The data records 146 may have been extracted from appropriate sources and stored in the distributed data store 160, and then transferred into the search engine index 144, e.g. by using an API of the search engine software 140. The data records 144 may represent data of any desired type, e.g. system event records, documents, and/or maintenance logs.

Examples of system event records include system log records and security monitoring application records.

Examples of system log records include Windows® event log records and Linux log file records.

Windows® event log records may be stored in and extracted from one or more of a Windows® Application log, a Windows® Security log, a Windows® Setup log, a Windows® System log, a Windows® Forwarded Events log, and application and/or service specific logs. Windows® event log records may be stored and/or output in the Windows XML, event log (EVTX) format, which is a binary XML, format, or in a format representing the data contained therein, e.g. the data in a human-readable XML format. Windows® event log records include one or more of the following properties: keywords, user, operational code, log (e.g. log text and/or markup), computer, process ID, thread ID, processor ID, session ID, kernel time, user time, processor time, correlation ID, relative correlation ID, and event source name.

Linux log records may be in a standardized format specified by the Internet Engineering Task Force (IETF) RFC 5424 standard or the IETF RFC 3164 format. Linux log file records may be stored in and extracted from one or more log files. The one or more log files may be stored in a log directory of a Linux system, e.g. a '/var/log' directory. Examples of log files include: messages, syslog, auth.log, kern.log and cron. Linux log file records include one or more of the following properties: a timestamp, a hostname, an IP address, a facility code, a severity level, a message component, a tag, a version number, an application name, a process identifier, and a message identifier.

Security monitoring application records are system event records produced by a security monitoring application. Examples of security monitoring applications include System Center Operations Manager (SCOM); Nagios; Rudder; and appropriately configured instances of Splunk and/or Kibana. The security monitoring application may be a network monitoring application. Examples of network monitoring applications include Zeek, Siricata and Snort. The security monitoring application may be an endpoint monitoring application. Examples of endpoint monitoring applications include Endgame, Carbonblack and Crowd-Strike. The security monitoring application 152 may be an advanced threat protection (ATP) application, e.g. Microsoft Office 365 Advanced Threat Protection. The security monitoring application may be an antivirus application, e.g. AVG Antivirus, BitDefender Security, ClamAV, Microsoft Windows Defender and Sophos Anti-Virus.

Each of the one or more data access servers 150 may include one or more processors (e.g. CPUs), a network interface, and memory. The processor(s) is configured to execute computer instructions that are stored in one or more computer-readable media, for example, the memory of the respective data access server. Each of the one or more data access servers 150 includes a network interface that is configured to allow the data access server to transmit and receive data in one or more networks, e.g. the one or more networks connecting the retrieval server 130 to at least one of the one or more data access servers 150 and/or one or more networks connecting at least one of the one or more data access servers 150 to the distributed data store 160. The network interface may include one or more network interface cards (NICs). The memory of each of the one or more data access servers 150 stores its respective data and instructions. In some embodiments, the one or more data access servers 150 may be a plurality of data access servers, e.g. a data access server cluster.

Each of the one or more data access servers 150 may include data access software 152. The data access software 152 may be configured to receive a data access query, which may be received from the retrieval server 130 and/or the retrieval software 132. The data access software 152 may locate data stored in the distributed data store 160 in response to receiving the data access query. The data access software may send data to the one or more retrieval servers 130 and/or retrieval software 132. The data access query may be received in a text format specified by the data access software 152 and/or via API calls to the data access software 152. For example, the data access query may be in Spark SQL, Cassandra Query Language or HiveQL. The located data may include one or more data records 166 and/or one or more data objects 168. The data access software 152 may be a library or other software for querying the distributed data store 160. Where there are a plurality of data access servers 150, the data access software 152 may be adapted for operating across multiple servers. For example, the data access software 152 may be a cluster-computing framework such as Spark or Hadoop. The data access software 152 may be adapted for batch retrieval and processing of data facilitating scalability over vast quantities of hardware but potentially increasing response time, e.g. it may take longer for data to be retrieved using the data access software 152 than using the search engine software 142. The data access software 152 may also be more suited to retrieving and processing large quantities of data than the search engine software 142. The data access software 152 may also be more tolerant of high latencies than the search engine software 142, facilitating its use across data access servers 150 distributed across different geographical locations and/or data centers, and facilitating its use with data stores distributed across multiple geographical locations and/or data centers.

The distributed data store 160 may be implemented using one or a plurality of data store computing devices 162-1-162-N. Each of the plurality of data store computing devices 162-1-162-N may include one or more processors (e.g., CPUs), a network interface, and memory. The processor(s) may be configured to execute computer instructions that are stored in one or more computer-readable media, for example, the memory of the data store computing device 162-1-162-N. Each data store computing device 162-1-162-N may include a network interface that is configured to allow the data store computing device to transmit and receive data in one or more networks. The network interface may include one or more network interface cards (NICs). The memory of each data store computing device 162-1-162-N may store data or instructions. The instructions stored in the memory may include respective data store server software 164-1-164-N.

The data store server software 164-1-164-N may be any suitable software for implementing a distributed data store across a plurality of data store computing devices 162-1-162-N. The distributed data store 160 may be a distributed database and the data store software 164 may be distributed database server, e.g. Cassandra, HBase, or Riak. The distributed data store 160 may be a distributed file store and the data store software 164 may be a distribute file store server, e.g. Hadoop Distributed File System (HDFS) or Amazon® Simple Storage Server (S3).

The data store server software 164-1-164-N may be adapted for scalability over vast quantities of hardware but these adaptations may increase the time taken for data retrieval, e.g. it may take longer for data to be retrieved from the distributed data store 160 than from the search engine index 144. The distributed data store server software 164-1-164-N may also be more suited to storing and providing large quantities of data than the search engine index 144. The distributed data store server software 164-1-164-N may also be more tolerant of high latencies than the search engine software 142 facilitating its use across data store computing devices 162 distributed across different geographical locations and/or data centers.

The data store computing devices 162-1-162-N may store a respective plurality of data records 166-1-166-N and/or a respective plurality of data objects 168-1-168-N.

Each data record of the plurality of data records 166-1-166-N includes values for one or more properties. The data records 166-1-166-N may have been extracted from appropriate sources and stored in the distributed data store 160, e.g. by using the data access software 152 or an API of the distributed data store server software 164-1-164-N. The plurality of data records 166-1-166- may represent data of any desired type, e.g. system event records, documents, and/or maintenance logs. The plurality of data records 166-1-166-N may be a superset of the plurality of data records 146 stored in the search engine index 146. In addition to the data records 146 stored in the search engine index 144, the plurality of data records 166-1-166-N may include 'lower value' data records. 'Lower value' data records may be data records of types where there are vast amounts of type of that data available and/or data which users of the data retrieval system 100 are willing to tolerate a higher access latency for, e.g. wait longer to see the relevant data.

Each data object of the plurality of data objects 168-1-168-N may include values for one or more properties. At least some of the data objects of the plurality of data objects 168-1-168-N may be rich data objects. Rich data objects may include one or more of nested data objects and/or references to other data objects. The structure of rich data objects and the associations between them may be defined using an ontology. The ontology may define object types, object hierarchy relationships, e.g. inheritance hierarchies, and/or object composition relationships. The ontology may also specify how objects of a given type should be displayed.

First Data Retrieval Method

Figure 2:
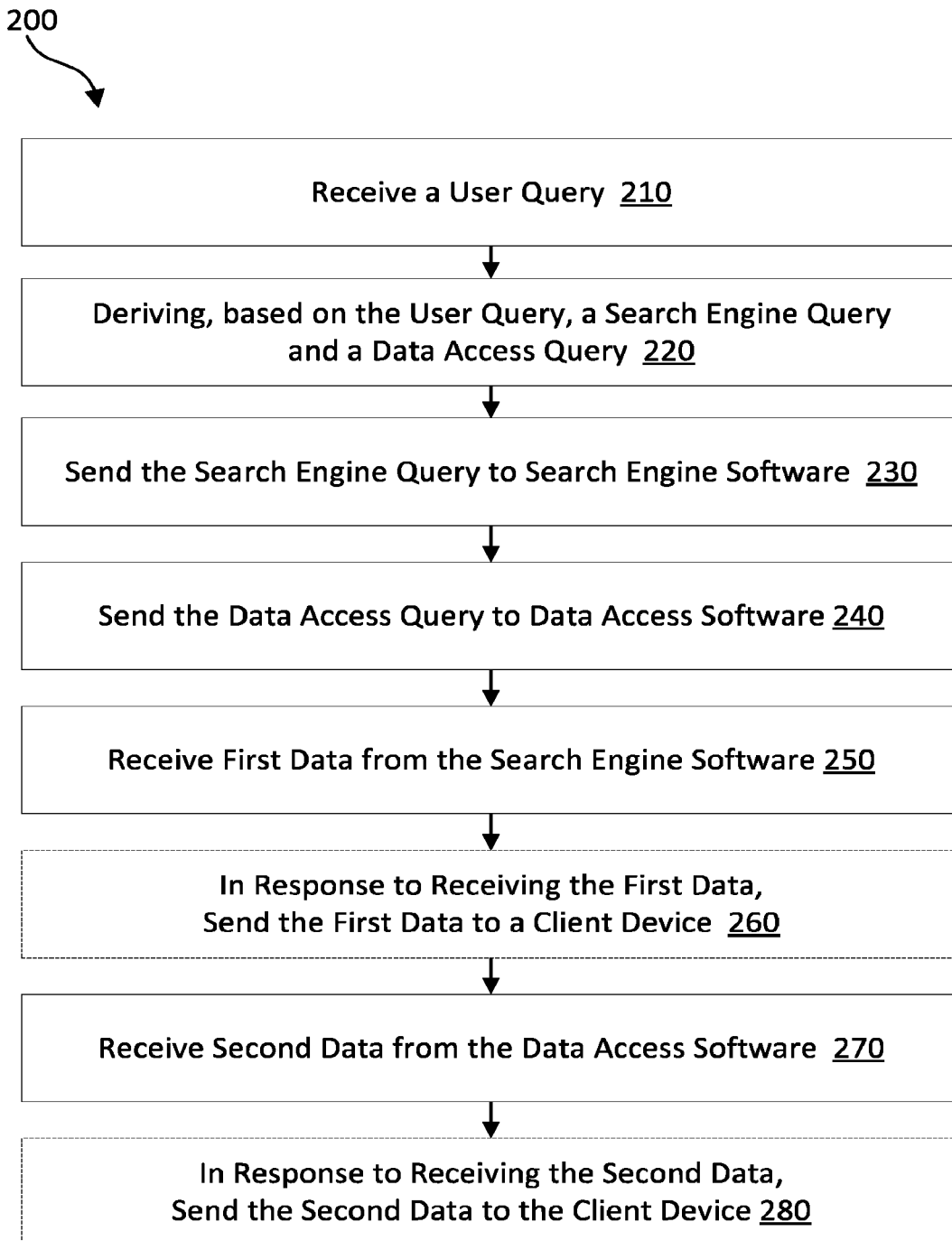
FIG. 2 is a flow diagram illustrating a first example method for retrieving data using search engine software and data access software, in accordance with example embodiments.

FIG. 2 is a flowchart illustrating a first example method 200 for retrieving data. The method 200 may be performed by computer-readable instructions, e.g. software, for execution by one or more processors of one or more computing devices (e.g., the computing device 500 of FIG. 6). In one embodiment, the one or more computing devices are the one or more retrieval servers 130. The method 200 may be performed using retrieval software, e.g. the above-mentioned retrieval software 132 of the one or more retrieval server(s) 130. The retrieval software 132 may be any number of and/or any combination of sequences of instructions, interpretable code, loadable modules, dynamic link libraries and/or computer programs. The retrieval software 132 may be implemented on a single computing device or distributed across multiple computing devices. Additional or fewer operations, or steps, may be used in some embodiments.

At step 210, a user query is received. The user query may be received from a client computing device, e.g. the client 120 or client software 122 shown in FIG. 1, or from an intermediary server computing device between the device implementing this method and a client computing device. The user query may be received in a query format constrained to operations capable of being executed by search engine software, e.g. the search engine software 142 shown in FIG. 1, and data access software 152, e.g. constrained to operations that can be represented both in a search query and a data access query. The query format may include corresponding operators for each operation in the intersection of the set of operations performable using the search engine software and the set of operations performable using the data access software, or may include corresponding operators for a subset of this intersection. The query format may be referred to as a common query language. The query format may be any suitable format, e.g. a text string, a markup language representation or a series of programmatic calls. The user query may be received using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage.

At step 220, a search engine query for use with search engine software and a data access query for use with data access query are derived based on the user query. The derived search engine query and the derived data access query are commensurate queries, e.g. if the search engine query was performed using the search engine software 142 and the data access query was performed using the data access software 152 on equivalent datasets, then the same data or substantially the same data would be returned. The commensurate queries may be derived by parsing or otherwise processing the user query to derive equivalent operators in a search engine query format for the search engine query and to derive equivalent operators in a data access query format for the data access query. The derived search engine query may be in a text format or may be one or more API calls for the search engine software. Examples of search engine query formats include the Query DSL (Domain Specific Language).

At step 230, the search engine query is sent to the search engine software 142 to cause the search engine software to locate first data stored in a search engine index 144. The search engine software may be the search engine software 142 described with respect to FIG. 1. The search engine index may be the search engine index 144 described with respect to FIG. 1. The search engine query may be sent to the search engine software 142 using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage.

At step 240, the data access query is sent to the data access software 152 to cause the data access software to locate second data stored in a distributed data store. The data access software may be the data access software 152 described with respect to FIG. 1. The distributed data store may be the distributed data store 160 described with respect to FIG. 1. The data access query may be sent to the data access software 152 using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage.

At step 250, first data is received from the search engine software 142. The first data may be received using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage. The first data may include one or more data records, e.g. at least one of the one or more data records 146-1 146-N described with respect to FIG. 1. The first data may be received from the search engine software 142 after a short time period, e.g. less than ten seconds, as the search engine software may be adapted for online use, e.g. to locate and retrieve some data relevant to the search engine query nearly instantaneously. The adaptation of the search engine software 142 to online use may limit the amount of data that can be efficiently located and retrieved for each query which may correspondingly limit the maximum size of the first data. For example, a single Elasticsearch query cannot be used to retrieve more than 10000 data records at a time. The size of the first data may correspondingly be limited to 10000 data records. The number of data records that may be efficiently or near instantaneously retrieved may have a lower limit, e.g. between 100 and 1000 data records. The size of the first data may corresponding be limited to a number of data records between 100 and 1000 data records.

Step 260 is optional, as is indicated by the dashed lines. At step 260, the first data is sent to a client device 120 in response to receiving the first data. Where the first data is received near instantaneously, e.g. because the search engine software 142 is adapted for online use, the first data may be sent to the client device 120 near instantaneously. The first data may be sent to the client device 120 using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage.

At step 270, the second data is received from the data access software 152. The second data may be received using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage. The second data may include one or more data records, e.g. at least one of the one or more data records 166-1-166-N described with respect to FIG. 1, and/or one or more data objects, e.g. at least one of the one or more data objects 168-1-168-N described with respect to FIG. 1. The second data may be received from the data access software 152 after a longer time period than the first data, e.g. one or more minutes, as the data access software may be adapted for batch processing, e.g. to retrieving and processing large quantities of data. The receiving of the second data may be subsequent to the receiving of the first data. The receiving of the second may be subsequent to sending the first data to the client device.

Step 280 is optional, as is indicated by the dashed lines. At step 280, the second data is sent to a client device 120 in response to receiving the second data. Where the second data is received after a longer time period than the first data, e.g. because the data access software 152 is adapted to batch processing, the second data may be sent to the client device 120 after a longer time period. The second data may be sent to the client device 120 using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage. The sending of the second data may be subsequent to the receiving of the first data. The sending of the second may be subsequent to sending the first data to the client device 120.

Second Data Retrieval Method

Figure 3:
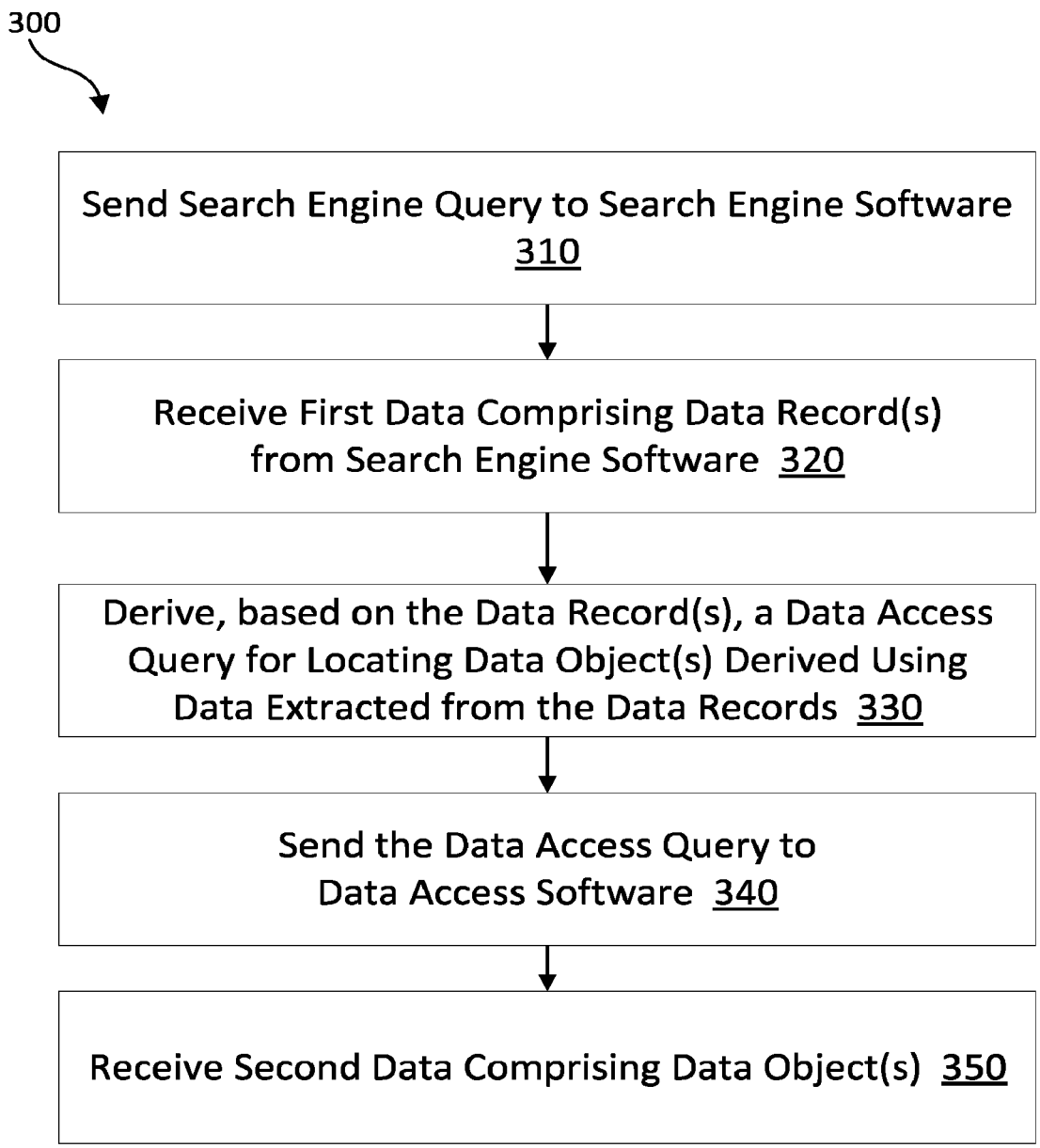
FIG. 3 is a flow diagram illustrating a second example method for retrieving data using search engine software and data access software, in accordance with example methods.

FIG. 3 is a flowchart illustrating a second example method 300 for retrieving data. The method 300 may be performed by computer-readable instructions, e.g. software, for execution by one or more processors of one or more computing devices (e.g., the computing device 500 of FIG. 6). In some embodiments, the one or more computing devices are the one or more retrieval servers 130 shown in FIG. 1. The method 300 may be performed using retrieval software, e.g. the retrieval software 132 shown in FIG. 1. The retrieval software 132 may be any number of and/or any combination of sequences of instructions, interpretable code, loadable modules, dynamic link libraries and/or computer programs. The retrieval software 132 may be implemented on a single computing device or distributed across multiple computing devices.

At step 310, a search engine query is sent to search engine software 142. The search engine query may be in a text format or may be one or more API calls for the search engine software. Examples of search engine query formats include the Query DSL (Domain Specific Language). The search engine query may be a derived search engine query, e.g. derived based on a user query as described in relation to step 220 of the first method 200. The search engine query may be sent to the search engine software 142 using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage.

At step 320, first data is received from the search engine software 142. The first data includes one or more data records, e.g. at least one of the one or more data records 146 described with respect to FIG. 1. The first data may be received using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage. The first data may be received from the search engine software 142 after a short time period, e.g. less than ten seconds, as the search engine software may be adapted for online use, e.g. to locate and retrieve some data relevant to the search engine query nearly instantaneously. The adaptation of the search engine software 142 to online use may limit the amount of data that can be efficiently located and retrieved for each query which may correspondingly limit the maximum size of the first data. For example, a single Elasticsearch query cannot be used to retrieve more than 10000 data records at a time. The size of the first data may correspondingly be limited to 10000 data records. The number of data records that may be efficiently or near instantaneously retrieved may have a lower limit, e.g. between 100 and 1000 data records. The size of the first data may corresponding be limited to a number of data records between 100 and 1000 data records.

At step 330, a data access query for locating one or more data objects derived using data extracted from the one or more data records is derived based on the one or more data records. Each data record of the one or more data records may include identifiers for a data object or data objects derived using the respective data record, e.g. one or more data object IDs. The derived data access query may include these identifiers such that the one or more objects can be located. Each data record of the one or more data records may include an identifier for itself, e.g. a data record identifier. The derived data access query may include these data record identifiers. The one or more data objects may include appropriate data record identifiers or otherwise indirectly reference and/or be connected to appropriate data record identifiers. The derived data access query may include the data record identifier for each of the one or more data records and include appropriate operations such that the one or more relevant data objects can be located. The derived data access query may be in a text format or may be one or more API calls for the data access software. Examples of data access query formats include Spark SQL, Cassandra Query Language and HiveQL. The data access query may be derived in response to receiving an indication from a client device that data objects related to one or more data records are desired.

At step 340, the data access query is sent to the data access software 152. The data access software may be the data access software 152 described with respect to FIG. 1. Sending the data access query to the data access software may cause the data access software 152 to locate second data in one or more data stores 162-1-162-N where the second data includes the one or more data objects 168-1-168-N. The one or more data stores 162-1-162-N may be the distributed data store 160 described with respect to FIG. 1. The data access query may be sent to the data access software 152 using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage.

At step 350, second data comprising the one or more data objects may be received from the data access software 152. At least some of the one or more data objects 168-1-168-N may be rich data objects. Rich data objects may include one or more of nested data objects and/or references to other data objects. The structure of rich data objects and the associations between them may be defined using an ontology. The ontology may define object types, object hierarchy relationships, e.g. inheritance hierarchies, and/or object composition relationships. The ontology may also specify how objects of a given type should be displayed. The second data may be received using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage. The second data may be received from the data access software after a longer time period than the first data, e.g. one or more minutes, as the data access software may be adapted for batch processing, e.g. to retrieving and processing large quantities of data. The receiving of the second data may be subsequent to the receiving of the first data.

Data Display Method

Figure 4:
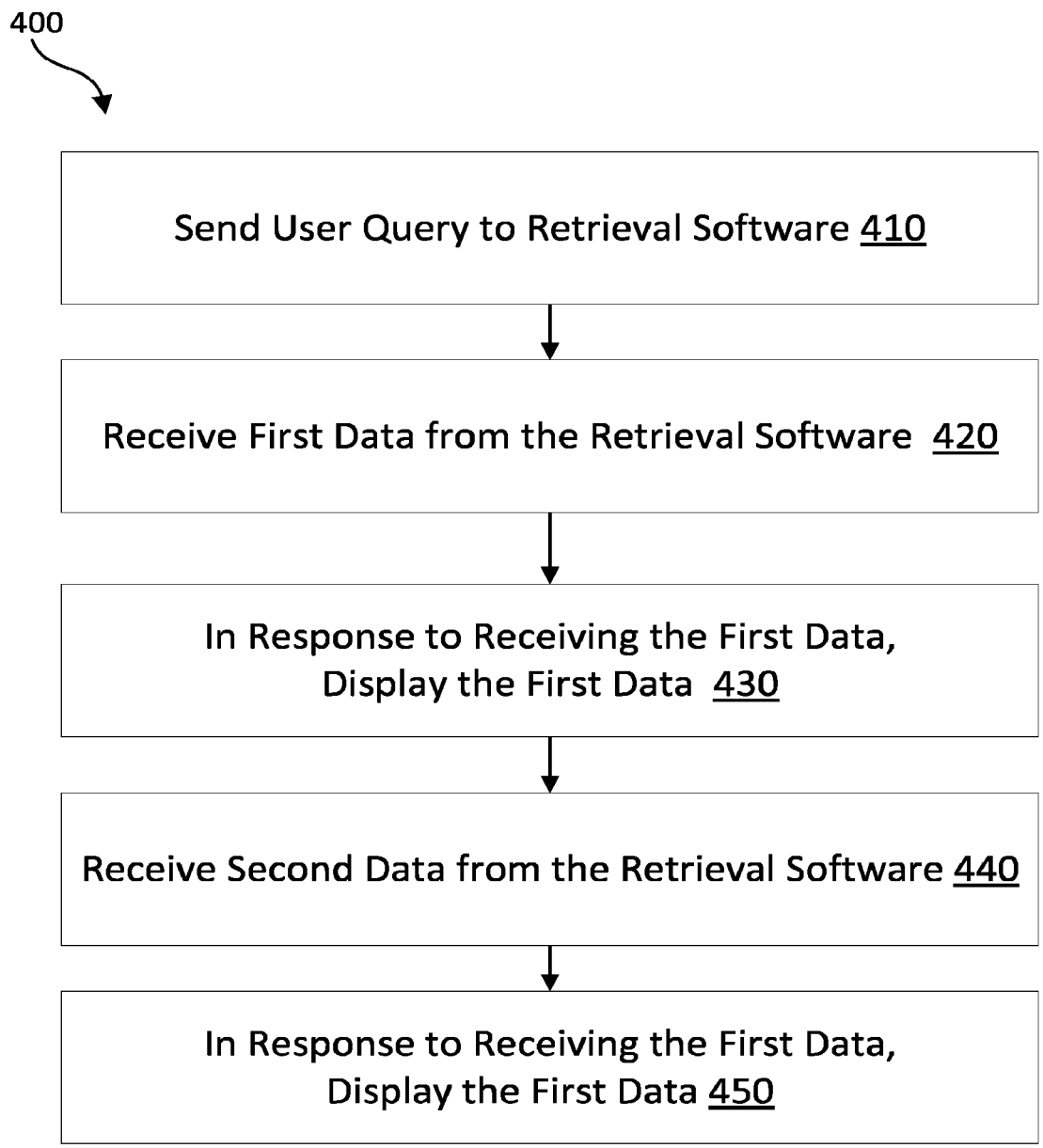
FIG. 4 is a flow diagram illustrating an example method for displaying data received from retrieval software, in accordance with example embodiments.

FIG. 4 is a flowchart illustrating an example method 400 for displaying data. The method 400 is performed by computer-readable instructions, e.g. software, for execution by one or more processors of one or more computing devices (e.g., the computing device 500 of FIG. 6). In one embodiment, the one or more computing devices are the client computing device 120. The method 400 may be performed using client software, e.g. the client software 122. The client software may be any number of and/or any combination of sequences of instructions, interpretable code, loadable modules, dynamic link libraries and/or computer programs. The client software may be implemented on a single computing device or distributed across multiple computing devices.

At step 410, a user query is sent to the retrieval software. The retrieval software may be, for example, retrieval software 132. The retrieval software 132 may be executed on a retrieval server, e.g. retrieval server 130. The user query may be or may be based on received user input, e.g. one or more keyboard inputs and/or one or more mouse inputs. The sending of the user query may be in response to one or more user inputs, e.g. a user pressing the enter key on a keyboard or clicking a button in a graphical user interface.

The user query may be sent in a query format constrained to operations capable of being executed by search engine software 142 and data access software 152, e.g. constrained to operations that can be represented both in a search query and a data access query. The query format may include corresponding operators for each operation in the intersection of the set of operations performable using the search engine software 142 and the set of operations performable using the data access software 152, or may include corresponding operators for a subset of this intersection. The query format may be referred to as a common query language. The query format may be any suitable format, e.g. a text string, a markup language representation or a series of programmatic calls. The user query may be sent using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage.

At step 420, first data is received from the retrieval software 132. The first data may be received in response to the sending of the user query to the retrieval software 132. The first data may be received near instantaneously after the sending of the user query as the first data may be data received from the search engine software 142 adapted for online use. The first data may include one or more data records 166-1-166-N. The one or more data records 166-1-166-N may be received in any suitable form. For example, the one or more data records 166-1-166-N may be received as or received as part of one or more strings; XML, formatted data; one or more JSON objects; one or more files and/or platform specific markup or binary format data. The first data may be received using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage.

At step 430, the first data is displayed in response to receiving the first data. Where the first data is received near instantaneously, the first data may be displayed near instantaneously. The first data may include one or more data records 166-1-166-N. The one or more data records 166-1-166-N may be displayed on the display simultaneously or using user interface elements whereby a user provides inputs to access some of the one or more data records and/or properties thereof. For example, the user may scroll down or scroll across to access some of the data records 166-1-166-N and/or some of the properties of the data records; and/or may click a user interface element, e.g. an expand button, to access some of the one or more properties of a data record. The one or more data records 166-1-166-N may be displayed in a format corresponding to and/or based on the format of the data records. For example, where the one or more data records 166-1-166-N are received as markup language, the display format may be based on the structure of the markup language.

At step 440, second data is received from the retrieval software 132. The second data may be received in response to the sending of the user query to the retrieval software 132. The second data may be received after a longer time period than the first data as the second data may be data received from data access software 152 adapted for batch processing. The second data may include one or more data records 166-1-166-N and/or one or more data objects 168-1-168-N. The one or more data records 166-1-166-N and/or one or more data objects 168-1-168-N may be received in any suitable form. For example, the one or more data records 166-1-166-N and/or one or more data objects 168-1-168-N may be received as or received as part of one or more strings; XML formatted data; one or more JSON objects; one or more files and/or platform specific markup or binary format data. The one or more data records 166-1-166-N and/or the one or more data objects 168-1-168-N may be received using any suitable mechanism, e.g. one or more remote service calls; one or more representational state transfer (REST) operations; one or more API calls; reception or retrieval of an event from an event queue; reception or retrieval of a message from a message queue; an internal networking protocol; a file sharing protocol or service; shared memory; or shared persistent storage.

At step 450, the first data is displayed in response to receiving the second data. Where the second data is received after a longer time period than the first data, the second data may be displayed after a longer time period than the first data, e.g. after one or more minutes. The second data may include one or more data objects 168-1-168-N and/or one or more data records 166-1-166-N. The one or more data objects 168-1-168-N and/or data records 166-1-166-N may be displayed on the display simultaneously or using user interface elements whereby a user provides inputs to access some of the one or more data objects, one or more data records and/or properties of other. For example, the user may scroll down or scroll across to access some of the data records 166-1-166-N or objects 168-1-168-N and/or some of the properties of the data records or objects; and/or may click a user interface element, e.g. an expand button, to access some of the one or more properties of a data record. The one or more data records 166-1-166-N may be displayed in a format corresponding to and/or based on the format of the data records. The one or more data objects 168-1-168-N may be displayed in a format corresponding to and/or based on the format of the data objects. For example, where the one or more data objects are received as markup language, the display format may be based on the structure of the markup language.

In some embodiments, the steps 440 and 450 may be repeated. In the first repetition, one or more data records 166-1-166-N may be received and displayed, and in the second repetition one or more data objects 168-1-168-N may be received and displayed.

Data Display User Interface

Figure 5A:
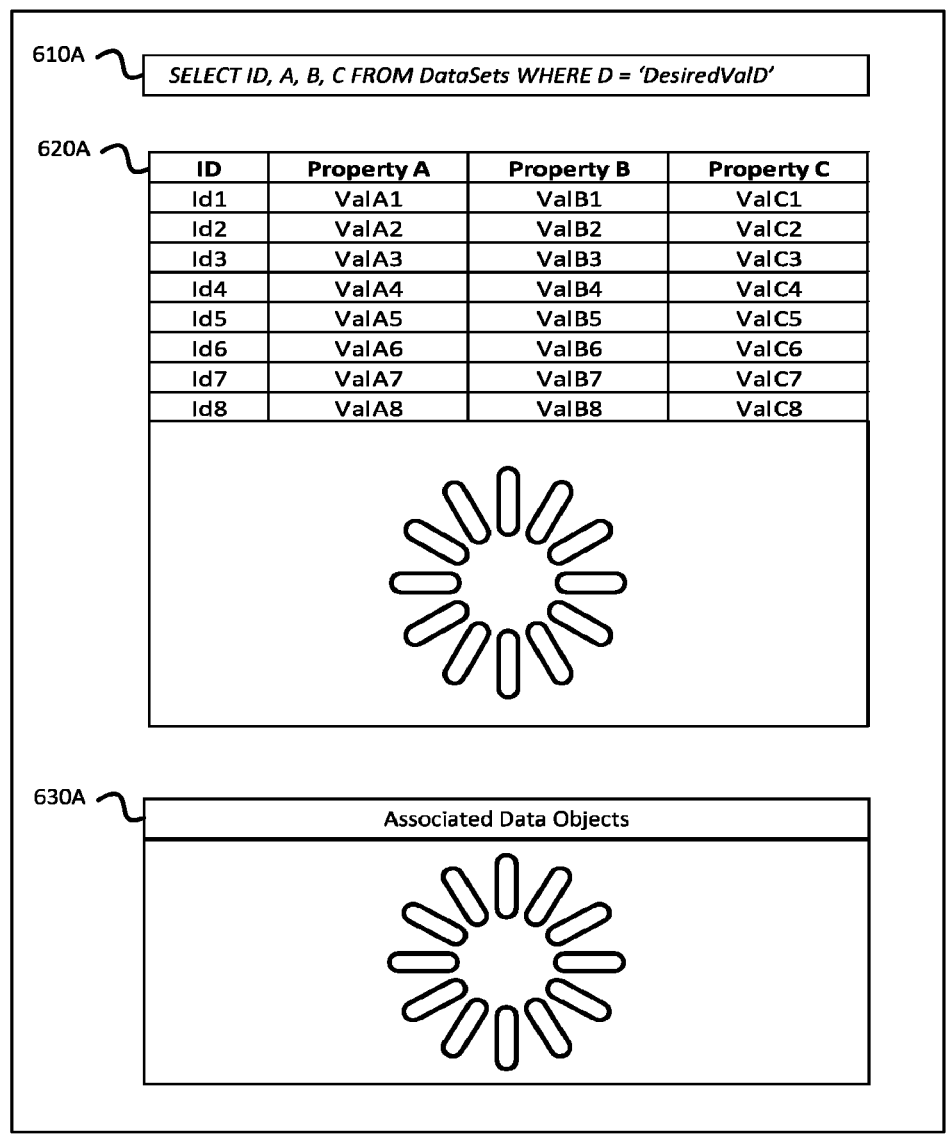
Figure 5B:
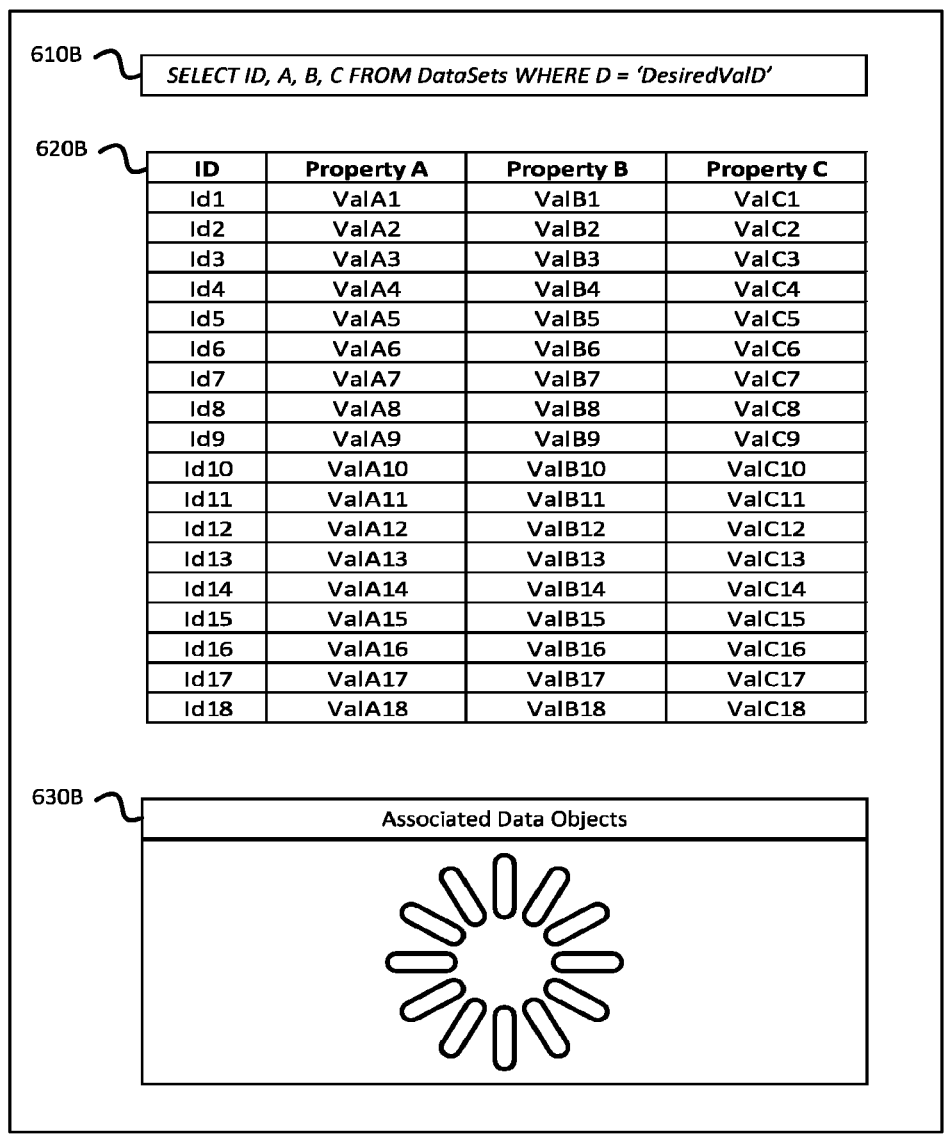

FIGS. 5A-5C illustrate example graphical user interfaces (GUIs) 600A-600C for displaying data received from retrieval software.

Referring to FIG. 5A, a GUI 600A may be displayed by a client application, e.g. the client application 122. For ease of explanation, the elements are shown in a single window but it should be noted that one or more parts of the illustrated GUI 600 may be in a separate tab, window or overlay, and/or may be dynamically shown or hidden.

The GUI 600A includes a query entry box 610A. A query may be entered into the query entry box 610A by a user, e.g. using one or more keyboard, mouse or touchscreen inputs. The query may be a user query in a user query format interpretable by the retrieval software 132 and/or may be a query in a format from which a user query in the user query format can be derived, e.g. a user query in the common query language.

The GUI 600A includes a data record display area 620A. The data record display area 620A shows data records received from the retrieval software 132 in, in this case, a tabular format. An identifier for each data record may be displayed. Values for each of one or more properties for each of the data records may be displayed. For example, in the illustration, values for each of three properties—Property A, Property B and Property C—are shown. As is shown in search user interface illustration 600A, the data record display area 620A may display initial after a query is entered and/or submitted. The initial data records may be data records received from retrieval software near instantaneously, e.g. because the retrieval software received these data records from search engine software adapted for online use. The initial data records may not fill the entirety of the data record display area 620A. The remainder of the data record display area 620A may display a loading symbol such as that shown. The loading symbol may be animated.

Referring to FIGS. 5B and 5C, in respect of GUIs 600B and 600C, additional data records may be subsequently displayed in the data record display areas 620B, 620C. These additional data records may be subsequently displayed as they are received from the retrieval software 132 after a longer time period than the initial data records, e.g. because the retrieval software received these data records from data access software adapted for batch processing.

The GUIs 600A-600C includes data object display areas 630A-630C. As is shown in FIGS. 5A and 5B, in respect of GUIs 600A and 600B, the data object display area 630A, 630B may initially display a loading symbol such as that shown. Subsequently, as illustrated in FIG. 5C for GUI 600C, details of objects are displayed in the object display area 630C. The displayed objects may be data objects derived from or otherwise associated with the data records displayed in the data record display area 620. For each data object, an object identifier may be displayed. Several properties for each data object may also be displayed, e.g. the object type, the object name and the identifiers of one or more data records associated with the object. A user may access further properties of an object by providing a user input to an area of the data object display area 630C included in or associated with the respective object. For example, the user may click on an expand button, such as the arrow symbol shown on the right-hand side for each of the data objects in the data object display area 630C. The data objects may be displayed subsequent to the initial data records, as they are received from the retrieval software after a longer time period than the initial data records, e.g. because the retrieval software received these data records from data access software adapted for batch processing. The data objects may be displayed subsequent to the additional data records as they are received from the retrieval software after a longer time period than the additional records, e.g. because the amount of data in the data objects is greater and/or the query to retrieve them is more complex.

Example Computing Device

Figure 6:
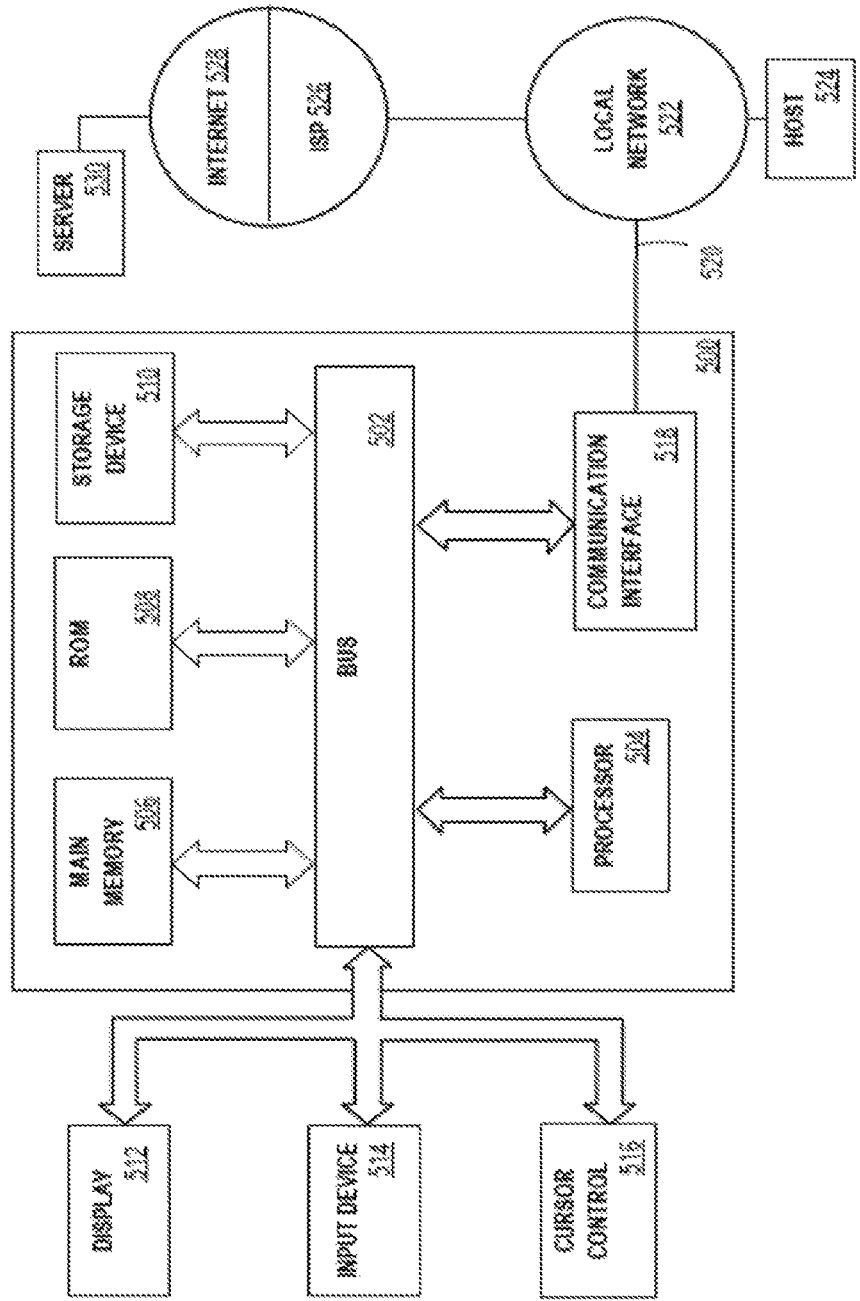
FIG. 6 is a schematic diagram of a computing device in which software-implemented processes of the example embodiments may be embodied.

Referring now to FIG. 6, it is a block diagram that illustrates an example computing device 500 in which software-implemented processes of the subject innovations may be embodied. Computing device 500 and its components, including their connections, relationships, and functions, is meant to be exemplary only, and not meant to limit implementations of the subject innovations. Other computing devices suitable for implementing the subject innovations may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor suitable for implementing the subject innovations.

Main memory 506, such as a random access memory (RAM) or other dynamic storage device, also may be coupled to bus 502 for storing information and instructions to be executed by processor(s) 504. Main memory 506 also may be used for storing temporary variables or other intermediate information during execution of software instructions to be executed by processor(s) 504.

Such software instructions, when stored in non-transitory storage media accessible to processor(s) 504, render computing device 500 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and instructions for processor(s) 504.

One or more mass storage devices 510 may be coupled to bus 502 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (e.g., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such instructions may be read into main memory 506 from another storage medium, such as storage device(s) 510. Execution of the software program instructions contained in main memory 506 cause processor(s) 504 to perform the functions of the disclosed systems, methods, and modules.

While in some implementations, functions of the disclosed systems and methods are implemented entirely with software instructions, hard-wired or programmable circuitry of computing device 500 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution The above-described example computer hardware is presented for purpose of illustrating the example underlying computer components that may be employed for implementing the subject innovations. The subject innovations, however, are not necessarily limited to any particular computing environment or computing device configuration. Instead, the subject innovations may be implemented in any type of system architecture or processing environment that one skilled in the art, in light of this disclosure, would understand as capable of supporting the features and functions of the subject innovations as presented herein.

Extensions and Alternatives

It is understood that any specific order or hierarchy of steps in the methods disclosed are an illustration of example approaches. Based upon design preferences, it is understood that the specific order or hierarchy of steps in the methods may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

What is claimed is:

1. A method, performed by one or more processors, comprising:
sending, to search engine software, a search engine query to cause the search engine software to locate first data stored in a first data store;
receiving, from the search engine software, the first data comprising one or more data records;
deriving, based on the first data, a data access query for locating second data using data extracted from the one or more data records, the second data comprising one or more data objects;
sending, to data access software, the data access query to cause the data access software to locate the second data stored in a second data store different from the first data store; and
receiving, from the data access software, the second data.

2. The method of claim 1, wherein:
the first data store includes a search engine index;
the search engine index is configured to store the one or more data records; and
the search engine index includes an inverted index that is a mapping associated with the one or more data records.

3. The method of claim 2, wherein at least one data record of the one or more data records requires a first access speed faster than a second access speed of a data record not stored in the search engine index.

4. The method of claim 2, wherein at least one data record of the one or more data records is associated with a first data type, wherein a first amount of data of the first data type is lower than a second amount of data of a second data type different from the first data type, wherein a data record of the second data type is not stored in the search engine index.

5. The method of claim 1, wherein the first data store includes a distributed inverted index that is distributed across a plurality of computing devices.

6. The method of claim 1, wherein the search engine query includes an application programming interface (API) call to the search engine software.

7. The method of claim 1, wherein a first time period is between sending the search engine query and receiving the first data, wherein a second time period is between sending the data access query and receiving the second data, wherein the first time period is shorter than the second time period.

8. The method of claim 1, wherein the second data store is a distributed data store that is implemented using a plurality of computing devices.

9. The method of claim 1, further comprising:
in response to receiving the first data, sending the first data to a client device; and
in response to receiving the second data, sending the second data to the client device;
wherein the receiving of the second data is subsequent to the receiving of the first data, and
wherein the one or more data objects in the second data are rich data objects defined using an ontology.

10. The method of claim 1, further comprising:
receiving a user query; and
deriving, based on the user query, the search engine query for use with the search engine software and the data access query for use with the data access software by at least:
processing the user query to derive one or more first operators in a search engine query format for the search engine query; and
processing the user query to derive one or more second operators in a data access query format for the data access query,
wherein each first operator of the one or more first operators is equivalent to a second operator of the one or more second operators.

11. A system comprising:
one or more processors; and
one or more memories storing instructions that when executed by the one or more processors cause the system to perform a set of operations, the set of operations comprising:

sending, to search engine software, a search engine query to cause the search engine software to locate first data stored in a first data store;

receiving, from the search engine software, the first data comprising one or more data records;

deriving, based on the first data, a data access query for locating second data using data extracted from the one or more data records, the second data comprising one or more data objects;

sending, to data access software, the data access query to cause the data access software to locate the second data stored in a second data store different from the first data store; and receiving, from the data access software, the second data.

12. The system of claim 11, wherein:

the first data store includes a search engine index;

the search engine index is configured to store the one or more data records; and the search engine index includes an inverted index that is a mapping associated with the one or more data records.

13. The system of claim 12, wherein at least one data record of the one or more data records requires a first access speed faster than a second access speed of a data record not stored in the search engine index.

14. The system of claim 12, wherein at least one data record of the one or more data records is associated with a first data type, wherein a first amount of data of the first data type is lower than a second amount of data of a second data type different from the first data type, wherein a data record of the second data type is not stored in the search engine index.

15. The system of claim 11, wherein the first data store includes a distributed inverted index that is distributed across a plurality of computing devices.

16. The system of claim 11, wherein the search engine query includes an application programming interface (API) call to the search engine software.

17. The system of claim 11, wherein a first time period is between sending the search engine query and receiving the first data, wherein a second time period is between sending the data access query and receiving the second data, wherein the first time period is shorter than the second time period.

18. The system of claim 11, wherein the second data store is a distributed data store that is implemented using a plurality of computing devices.

19. The system of claim 11, wherein the set of operations further comprise:

in response to receiving the first data, sending the first data to a client device; and in response to receiving the second data, sending the second data to the client device;

wherein the receiving of the second data is subsequent to the receiving of the first data, and wherein the one or more data objects in the second data are rich data objects defined using an ontology.

20. The system of claim 11, wherein the set of operations further comprise:

receiving a user query; and deriving, based on the user query, the search engine query for use with the search engine software and the data access query for use with the data access software by at least:

processing the user query to derive one or more first operators in a search engine query format for the search engine query; and processing the user query to derive one or more second operators in a data access query format for the data access query, wherein each first operator of the one or more first operators is equivalent to a second operator of the one or more second operators.

* * * * *